US006595678B2

(12) United States Patent
Folestad et al.

(10) Patent No.: US 6,595,678 B2
(45) Date of Patent: Jul. 22, 2003

(54) MIXING APPARATUS

(75) Inventors: Staffan Folestad, Västra Frölunda (SE); Mats O. Johansson, Jonsered (SE)

(73) Assignee: AstraZeneca AB, Sodertalje (SE)

( * ) Notice: Subject to any disclaimer, the term of this patent is extended or adjusted under 35 U.S.C. 154(b) by 0 days.

(21) Appl. No.: 09/807,546

(22) PCT Filed: Feb. 12, 2001

(86) PCT No.: PCT/SE01/00277

§ 371 (c)(1),
(2), (4) Date: Apr. 12, 2001

(87) PCT Pub. No.: WO01/60503

PCT Pub. Date: Aug. 23, 2001

(65) Prior Publication Data

US 2002/0136089 A1 Sep. 26, 2002

(30) Foreign Application Priority Data

Feb. 17, 2000 (SE) ............................................ 0000522

(51) Int. Cl.[7] ........................... B01F 15/00; B01F 7/00; G01N 21/25; G01N 21/21

(52) U.S. Cl. ....................... 366/142; 366/287; 356/319; 356/301; 356/367

(58) Field of Search ................................ 366/287, 142, 366/143, 279, 288; 356/319, 325, 326, 323, 301, 367, 402, 425

(56) References Cited

U.S. PATENT DOCUMENTS

| | | | | |
|---|---|---|---|---|
| 4,125,327 A | | 11/1978 | Margolis | 356/39 |
| 4,283,148 A | * | 8/1981 | Peterson | 366/142 |
| 4,332,479 A | * | 6/1982 | Crocker et al. | 366/144 |
| 4,534,658 A | * | 8/1985 | De Vries | 366/287 |
| 4,769,830 A | * | 9/1988 | Peterson et al. | 378/53 |
| 5,123,748 A | * | 6/1992 | Schroer | 366/287 |
| 5,649,765 A | * | 7/1997 | Stokes et al. | 366/287 |
| 5,890,803 A | * | 4/1999 | Jolink | 366/287 |
| 5,946,088 A | * | 8/1999 | Aldridge | 356/300 |
| 6,174,497 B1 | * | 1/2001 | Roinestad et al. | 366/142 |
| 6,490,035 B1 | * | 12/2002 | Folestad et al. | 356/319 |

FOREIGN PATENT DOCUMENTS

| | | | |
|---|---|---|---|
| DE | 3337403 | | 5/1985 |
| DE | 3508711 | | 9/1986 |
| EP | 0 631 810 | * | 1/1995 |
| EP | 0706041 | | 4/1996 |
| WO | WO 97/46860 | * | 12/1997 |

OTHER PUBLICATIONS

Derwent Abstract of SU1402856, Jun. 15, 1988.
Patent Abstracts of Japan of JP05016134, Jun. 6, 1991.

* cited by examiner

*Primary Examiner*—Tony G. Soohoo
(74) *Attorney, Agent, or Firm*—White & Case LLP

(57) ABSTRACT

A mixing apparatus for preparing from a plurality of materials, preferably powders, in particular components of a pharmaceutical composition, a mixture having a required homogeneity, comprising a non-rotating mixing vessel (7); at least one feeding mechanism for feeding said materials into said vessel (7); a stirring means (31) inside said vessel (7) for preparing said mixture; and at least one measuring device (23) for monitoring in-line at one or more locations in said vessel (7) the homogeneity of the mixture being prepared therein, wherein said at least one measuring device (23) comprises a unit for directing input radiation into said vessel (7), and at least one detector unit (45) for detecting output radiation formed by interaction of said input radiation with said materials in said vessel (7).

38 Claims, 4 Drawing Sheets

MIXING APPARATUS

The present invention relates to an apparatus for and a method of mixing a plurality of materials, specifically powders, in particular components of a pharmaceutical composition, into a mixture having a required homogeneity.

The mixing of pharmaceutical compositions is a crucial step in processing an active drug into a form for administration to a recipient. Pharmaceutical compositions consist of a number of separate components, including the active drug, which must be mixed into a homogeneous mixture to ensure that the appropriate dosage of the active drug is delivered to the recipient.

The concentration of the non-active components in a pharmaceutical mixture is also important since it determines the physical properties of the mixture, such as the rate of dissolution of a tablet in a recipient's stomach.

One prior art apparatus for mixing the components of a pharmaceutical composition into a homogeneous mixture is known from EP-B-0 631 810. This known apparatus comprises a container, in which the mixture is being prepared by continuously rotating the container. A spectroscopic measuring device is arranged for in-line measurement of the homogeneity of the mixture being prepared in the rotating container. The measuring device has a probe that enters the container through an aperture coinciding with the axis of rotation of the container.

One major disadvantage of this prior-art apparatus is the limited access to the interior of the container. Thus, there is little freedom for finding optimised positions for in-line monitoring. For example, in all types of powder blenders there is a risk for having local zones that are either stagnant or where mixing is less efficient than in other positions in the blender. Thus, the monitored homogeneity on the axis of rotation might not be representative of the actual homogeneity of the mixture in the container. Further, the prior art apparatus is undesirably complicated in construction.

SU-A-1 402 856 discloses an apparatus for mixing thermo-chromic compositions, such as mixtures of cholesteric liquid crystals. The ingredients are fed 10 a stationary container provided with a central stirrer. A thin layer of the mixture is allowed to pass between an interior plate and a window of the container. By inducing temperature gradients in this layer, by means of heaters, the degree of homogeneity is determined by analysis of the colour-temperature characteristics observed at the window. This type of apparatus is unsuitable for monitoring the homogeneity of most substances, and in particular pharmaceutical compositions and the like.

The object of the invention is to find a solution to the above described problems.

This object is achieved by an apparatus and a method according to the accompanying independent claims. Preferred embodiments are set forth in the dependent claims.

With the inventive technique, the measuring device can be arranged to monitor the homogeneity of the mixture at any location in the vessel. The non-rotating vessel provides for ease of attachment of the measuring devices to the vessel. Also, the measurements can be made non-invasively, i.e. without affecting the materials being mixed. Further, the homogeneity of the mixture can be monitored at any desired number of locations simultaneously. This will provide for a more optimised measurement, which will gives a better picture of the actual status of mixing process in the vessel, both with respect to local inhomogeneities as well as to a weighted average measure of the homogeneity in the entire batch.

Preferred embodiments of the present invention will now be described hereinbelow by way of example only with reference to the accompanying drawings, in which FIG. 1 schematically illustrates a mixing apparatus in accordance with a first embodiment of the present invention;

Figure 1:
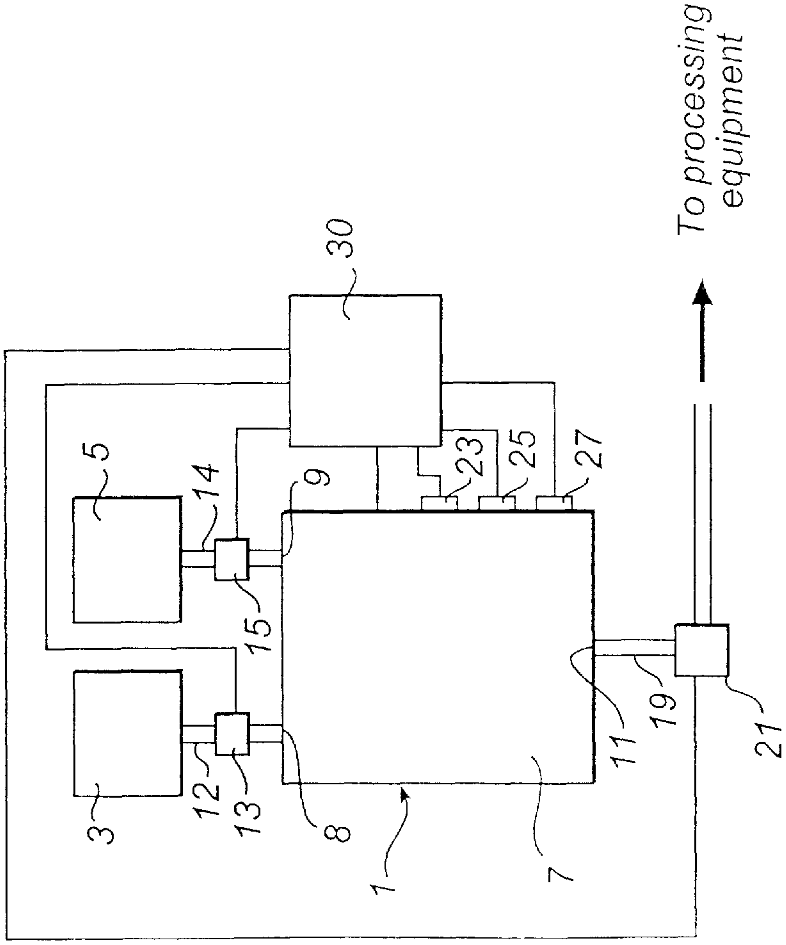

The mixing apparatus shown in FIG. 1 comprises a mixing device 1 for mixing materials, in this embodiment a batch mixer having a stationary, non-rotating mixing vessel, in particular a convective mixer with an internal stirring means (not shown), and a first supply vessel 3 for containing a first material to be mixed by the mixing device 1 and a second supply vessel 5 for containing a second material to be mixed by the mixing device 1. The mixing device 1 includes a mixing vessel 7 and has first and second inlet ports 8, 9 in a top portion of the vessel 7 and an outlet port 11 in a bottom portion of the vessel 7. The first inlet port 8 of the mixing device 1 is connected to the first supply vessel 3 by a first feed line 12 which includes a first feed mechanism 13, typically a pneumatic or mechanical device, for metering a predeterminable amount of the first material to the mixing device 1. The second inlet port 9 of the mixing device 1 is connected to the second supply vessel 5 by a second feed line 14 which includes a second feed mechanism 15, typically a pneumatic or mechanical device, for feeding a predeterminable amount of the second material to the mixing device 1.

The mixing apparatus further comprises a supply line 19 connected to the outlet port 11 of the mixing device 1 for supplying mixed material to processing equipment, such as a tabletting machine. A section of the supply line 19 is horizontally directed and mixed material exiting the outlet port 11 of the mixing device 1 cannot pass through the supply line 19 by gravitational force. The supply line 19 includes a feed mechanism 21, typically a pneumatic or mechanical device, for feeding material therethrough. In an alternative embodiment, not shown, the supply line 19 is configured such that material passes therethrough by gravitational force. In this case, the supply pipe would be essentially vertical. In such an embodiment, the feed mechanism 21 could be substituted for a flow valve or any other suitable on/off device.

The mixing apparatus further comprises along a wall portion of the vessel 7 a plurality of measuring devices, in this embodiment first, second and third measuring devices 23, 25, 27, for measuring at a plurality of locations the homogeneity or composition of the mixture being prepared in the vessel 7. Each measuring device 23, 25, 27 is directly mounted or interfaced to a port in the wall of the vessel 7. As will be further described below with respect to FIGS. 3–6, each measuring device is adapted to direct input radiation into the vessel 7, and receive output radiation formed by interaction of the input radiation with the mixture of materials in the vessel 7.

The mixing apparatus further comprises a controller 30, typically a computer or a programmable logic controller (PLC), for controlling the operation of each of the mixing device 1, the first feed mechanism 13 connected to the first supply vessel 3, the second feed mechanism 15 connected to the second supply vessel 5, the feed mechanism 21 in the supply line 19, and the first, second and third measuring devices 23, 25, 27.

Figure 2:
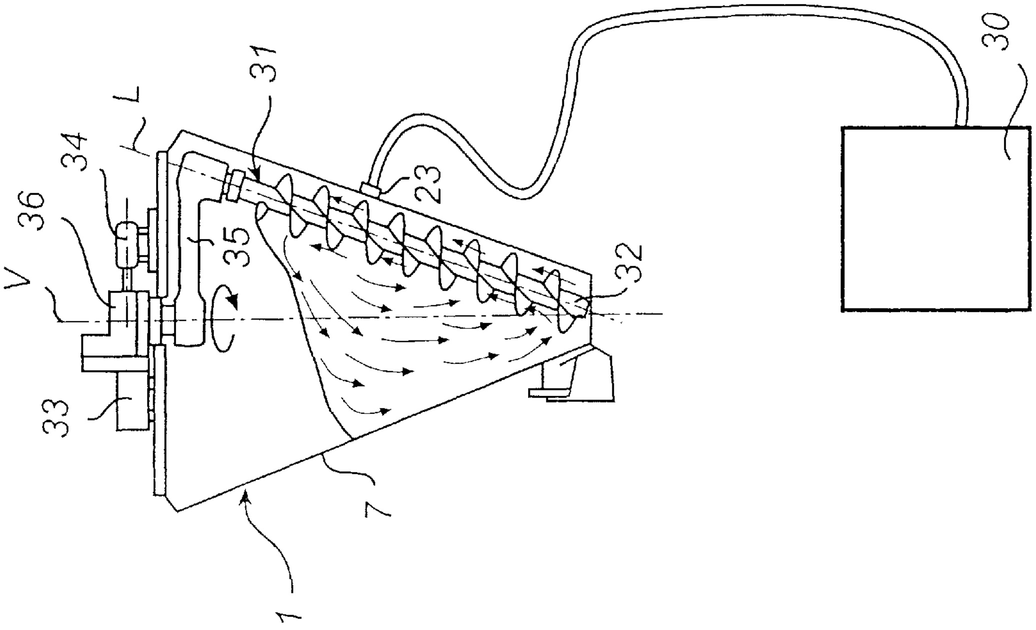
FIG. 2 illustrates in more detail a mixing apparatus in accordance with an alternative second embodiment of the present invention.

An alternative construction of the mixing apparatus is shown in FIG. 2. Here, the mixing device 1 is of a convective type, more specifically a so-called Nauta mixer. Like the first embodiment, the mixing vessel 7 is stationary and non-rotating. The vessel 7 has essentially the shape of an inverted cone with a vertical centre line V. A mixing screw 31 is arranged in the vessel 7 to promote mixing of the materials entering through the inlet ports (not shown). The screw 31 is of Archimedes' type, extends along a longitudinal axis L and has spiral or broad-threaded grooves. A first end 32 of the screw 31 is arranged at the bottom of the vessel 7, i.e. essentially on the vertical centre line V. A first driver 33, such as an electric motor or the like, is arranged to rotate the screw 31 around its longitudinal axis L. A second driver 34, such as an electric motor or the like, is connected to the screw 31 via an arm 35 and is arranged to bring about a precessing movement of the screw 31 around the vertical centre line V. The drivers 33, 34 are connected to the screw 31 and the arm 35, respectively, via a gear box 36.

In use, the screw 31 moves along the inner surface of the vessel 7. Thus, the screw 31 is subject to a planetary movement inside the vessel 7. Blending of materials, such as powders, is in this way accomplished through lifting subfractions of the powder in the vessel 7 from the bottom of the vessel 7 to the top. This type of mixing device 1 is particularly beneficial for blending powders where segregation between different components, such as fine and coarse powders, is likely to occur.

The apparatus has an outlet port 11 at the bottom of the vessel 7. Like the first embodiment, a supply pipe (not shown) is connected to the outlet port 11, and a flow control mechanism (not shown) is arranged to cause the mixture to flow through the supply line to a subsequent processing equipment.

The mixing apparatus of FIG. 2 further comprises a measuring device 23 which cooperates with a stationary wall portion of the vessel 7 for measuring the homogeneity or composition of the mixture being prepared in the vessel 7. The mixing apparatus further comprises a controller 37, typically a computer or a programmable logic controller (PLC), for controlling the operation of each of the mixing device 1, any feed mechanism (not shown) at the inlet ports for feeding material into the vessel 7, any feed mechanism at the outlet port 11 for feeding the homogeneous mixture to the subsequent processing equipment, and the measuring device 23. The measuring device 23 is structurally similar to the measuring devices of the first embodiment in FIG. 1, and the following description of the measuring devices is equally applicable to all embodiments of the mixing apparatus.

Figure 3:
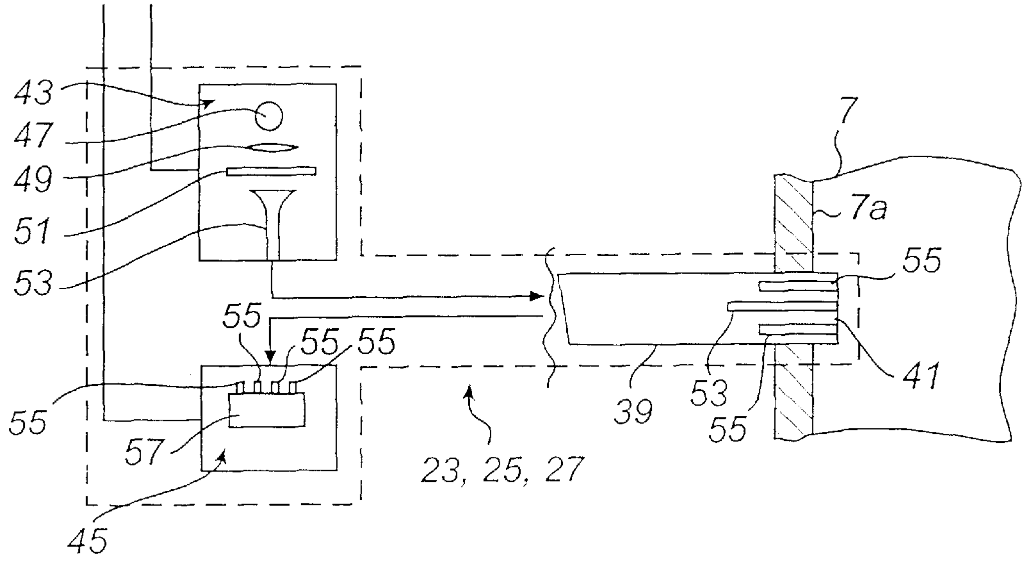
FIG. 3 illustrates a measuring device of the mixing apparatuses of FIGS. 1 and 2.

As illustrated in FIG. 3, each of the measuring devices 23, 25, 27 is a reflectance measuring device of the same construction and comprises a measurement probe 39, in this embodiment a reflectance probe, which extends through the peripheral wall 7*a* of the vessel 7 such that the distal end 41 of the measurement probe 39, through which radiation is emitted and received, is directed into the vessel 7, or flush with the wall portion 7*a*. In this way, reflectance measurements can be taken from the mixture being prepared in the vessel 7. Each of the measuring devices 23, 25, 27 further comprises a radiation generating unit 43 for generating electromagnetic radiation, and a detector unit 45 for detecting the radiation diffusely reflected by the material in the vessel 7. In this embodiment, the radiation generating unit 43 comprises in the following order a radiation source 47, a focusing lens 49, a filter arrangement 51 and at least one fibre cable 53 for leading the focused and filtered radiation to the distal end 41 of the measurement probe 39. In this embodiment, the radiation source 47 is a broad spectrum visible to infra-red source, such as a tungsten-halogen lamp, which emits radiation in the near infra-red interval of from 400 to 2500 nm and the filter arrangement 51 comprises a plurality of filters each allowing the passage of radiation of a respective single frequency or frequency band. In other embodiments, the radiation source 47 could be any of a source of visible light, such as an arc lamp, a source of x-rays, a laser, such as a diode laser, or a light-emitting diode (LED) and the filter arrangement 51 could be replaced by a monochromator or a spectrometer of Fourier transform kind. In this embodiment the detector unit 45 comprises in the following order an array of fibre cables 55, whose distal ends are arranged around the distal end of the at least one fibre cable 53 through which radiation is emitted, and a detector 57 connected to the fibre cables 55. The detector 57 is preferably one of an integrating detector, such as an Si, PbS or In—Ga—As integrating detector, a diode array detector, such as an Si or In—Ga—As diode array detector, or a one or two-dimensional array detector, such as a CMOS chip, a CCD chip or a focal plane array. The distal ends of the fibre cables 55 are preferably spaced from the distal end of the at least one fibre cable 53 in order to minimise the effect of specular reflection or stray energy reaching the fibre cables 55. In use, the detector 57 will produce signals depending upon the composition of the mixture and the frequency of the provided radiation. These signals are amplified, filtered and digitised and passed to the controller 37.

Figure 4:
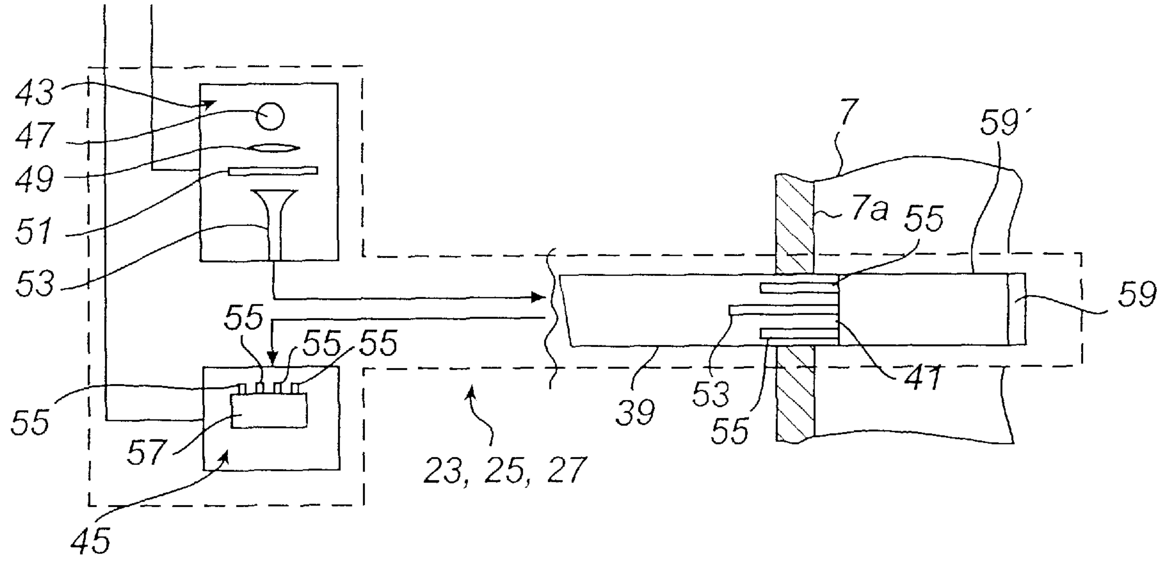
FIG. 4 illustrates a first modified measuring device.
Figure 5:
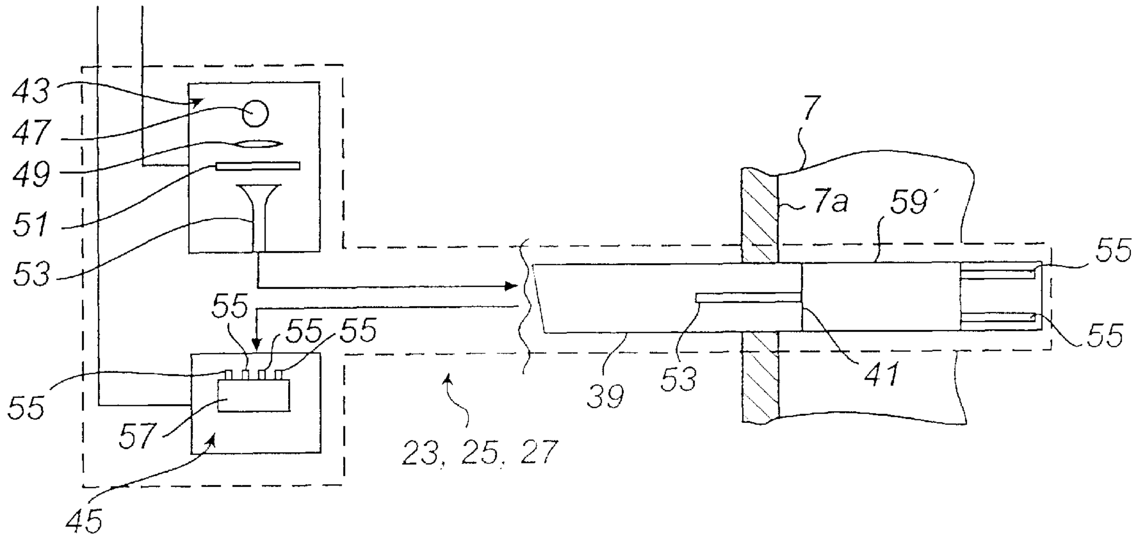
FIG. 5 illustrates a second modified measuring device.
Figure 6:
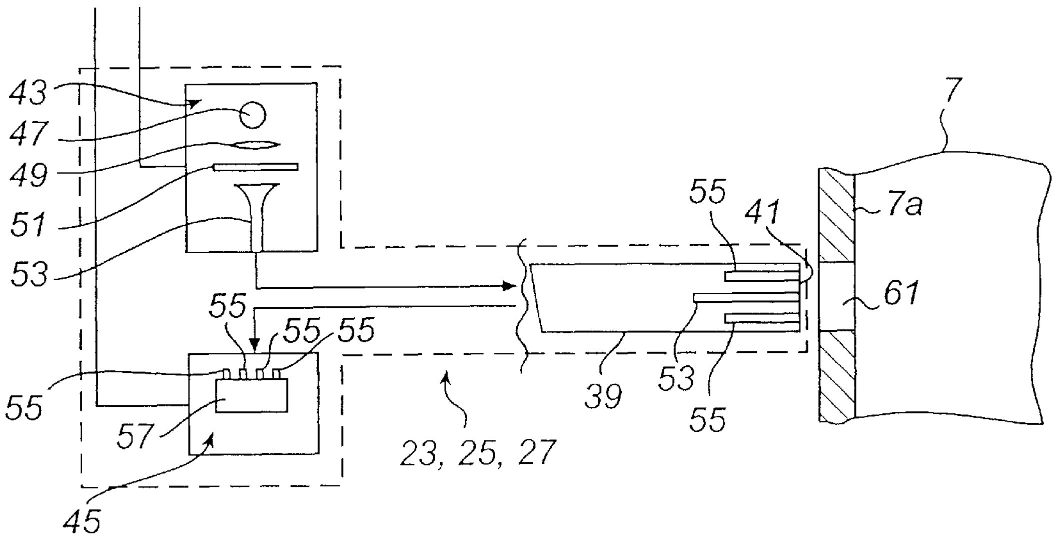
FIG. 6 illustrates a third modified measuring device.

FIGS. 4–6 illustrate modified measuring devices 23, 25, 27 for the above-described mixing apparatus. These modified measuring devices 23, 25, 27 are quite similar structurally and operate in the same manner as the above-described measuring devices 23, 25, 27. Hence, in order not to duplicate description unnecessarily, only the structural differences of these modified measuring devices 23, 25, 27 will be described.

FIG. 4 illustrates a first modified measuring device 23, 25, 27 which operates as a transflective measuring device. This measuring device 23, 25, 27 differs from the first-described measuring device 23, 25, 27 in that a reflective surface 59, typically a mirrored surface, is disposed in the vessel 7, in this embodiment on a holder 59' extending from the distal end 41 of the probe 39, opposite the path of the radiation provided by the at east one fibre cable 53. In use, radiation provided by the at least one fibre cable 53 passes through the material in the vessel 7 and is reflected back to the fibre cables 55 by the reflective surface 59.

FIG. 5 illustrates a second modified measuring device 23, 25, 27 which operates as a transmissive measuring device. This measuring device 23, 25, 27 differs from the first-described measuring device 23, 25, 27 in that the distal ends of the fibre cables 55 are disposed inside the vessel 7, in this embodiment by means of the holder 59', opposite the path of the radiation provided by the at least one fibre cable 53. In use, radiation provided by the at least one fibre cable 53 passes through the material in the vessel 7 and is received by the opposing fibre cables 55.

FIG. 6 illustrates a third modified measuring device 23, 25, 27 which operates as a reflective measuring device. This measuring device 23, 25, 27 differs from the first-described measuring device 23, 25, 27 only in that the measurement probe 39 does not extend into the vessel 7. Instead, the peripheral wall 7_a_ of the vessel 7 includes a window 61 which is transparent or at least translucent to the radiation employed by the measuring device 23, 25, 27.

In use, the first and second feed mechanisms 13, 15 connected respectively to the first and second supply vessels 3, 5 are controlled by the controller 30 to meter in the required proportions amounts of the first and second materials to the mixing vessel 7 of the mixing device 1. Under the control of the controller 30 the mixing device 1 is then operated while continuously monitoring, by means of the measuring devices 23, 25, 27, the homogeneity of the mixture being prepared in the vessel 7. When a desired degree of homogeneity is achieved in the mixture, the feed mechanism 21 in the supply line 19 is actuated to feed mixed material from the mixing vessel 7 of the mixing device 1 through the supply line 19 to the processing equipment, under the control of the controller 30.

Figure 7:
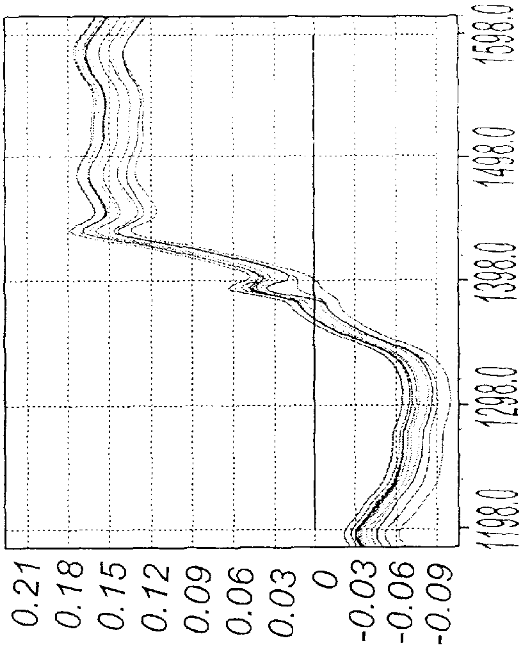
FIG. 7 shows spectrally resolved radiation in the NIR range collected during preparation of a mixture in the measuring apparatus of FIG. 2.

FIG. 7 shows an example of a number of samples vectors containing spectrally resolved radiation received from the mixture in the vessel 7 at several consecutive instants during a mixing process. Evidently, the intensity and the spectral shape of the collected radiation changes during these steps. These measurement data were obtained using near-infrared spectrometry (NIRS), by means of a measuring device similar to the one shown in FIG. 3.

Figure 8:
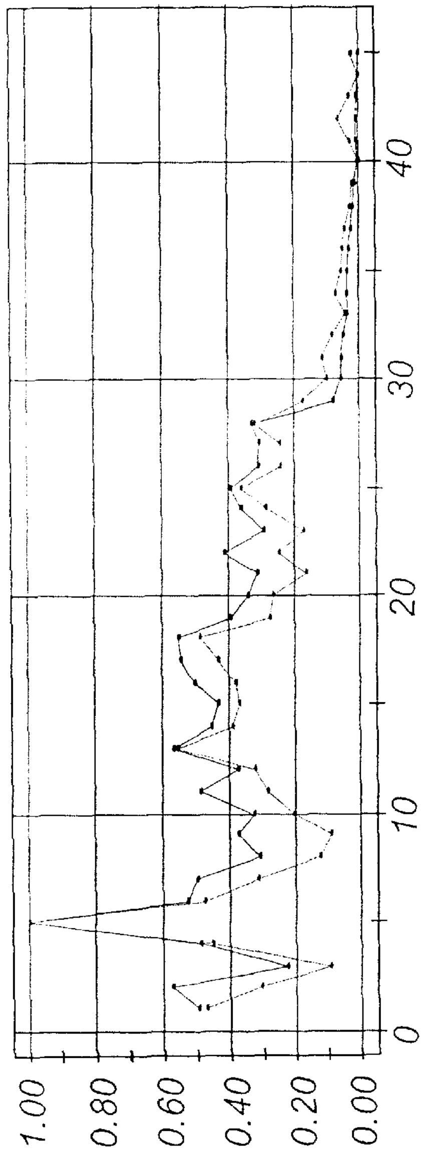
FIG. 8 shows a plot resulting from a Principal Component Analysis of data similar to those presented in FIG. 7.

In the controller 30, the sample vectors are evaluated in order to extract information related to the homogeneity of composition of the mixture. This evaluation can include chemometric methods. More particularly and at least in the case of continuous measurements during the coating process, a multivariate analysis, such as PCA (Principal Component Analysis), or PLS (Partial Least Squares) is performed on the sample vector. The result of such an evaluation using PCA is shown in FIG. 8, for first (top) and second (bottom) principal components derived from a time series of sample vectors. The trajectories of the principal components over time allow for in-line monitoring of the mixing process inside the vessel. The end point of the mixing process, i.e. when a desired degree of homogeneity is obtained and the mixture can be fed to the subsequent processing equipment, is clearly identified after approximately 40 minutes, where the changes in the curve levels out.

In should be realised that, alternatively, a single peak or a wavelength region could be selected, the height or area of which being correlated with the homogeneity of the mixture.

Finally, it will be understood by a person skilled in the art that the present invention has been described in its preferred embodiments and can be modified in many different ways without departing from the scope of the invention as defined by the appended claims.

Firstly, for example, whilst the mixing apparatuses of the above-described embodiments are configured to supply a mixture of two materials, it will be understood that these mixing apparatuses are readily adaptable to mix any number of materials.

Secondly, for example, in a further modified embodiment the measuring devices 23, 25, 27 employed in the mixing apparatuses of the above-described embodiments could include only the measurement probe 39 and instead the mixing apparatuses include only a single radiation generating unit 43 and a single detector unit 45 which are selectively coupled to a respective one of the measuring devices 23, 25, 27 by a multiplexer unit under the control of the controller 30.

It should also be realised that the measuring devices could include integrating as well as imaging detectors.

What is claimed is:

1. A mixing apparatus for preparing a mixture having a required homogeneity from a plurality of materials, comprising:

a non-rotating mixing vessel;

at least one feeding mechanism for feeding the materials into the vessel;

a stirring means inside the vessel for preparing the mixture; and at least one measuring device configured to monitor in-line the homogeneity of the mixture being prepared in the vessel at a plurality of locations in the vessel, wherein the measuring device comprises a unit for directing input radiation into the vessel, and at least one detector unit for detecting output radiation following interaction of the input radiation with the materials in the vessel.

2. The apparatus according to claim 1, comprising a plurality of measuring devices for monitoring in-line at a plurality of locations in the vessel the homogeneity of the mixture being prepared in the vessel.

3. The apparatus according to claim 1, wherein the measuring device cooperates with at least one stationary wall portion of the vessel.

4. The apparatus according to claim 1, wherein the measuring device is attached to at least one stationary wall portion of the vessel.

5. The apparatus according to claim 1, wherein the measuring device is a spectroscopic measuring device.

6. The apparatus according to claim 5, wherein the spectroscopic measuring device is a reflectance, transflectance, or transmission device.

7. The apparatus according to claim 5 or 6, wherein the spectroscopic measuring device is an infra-red spectrophotometer.

8. The apparatus according to claim 5 or 6, wherein the spectroscopic measuring device is a near infra-red spectrophotometer.

9. The apparatus according to claim 5 or 6, wherein the spectroscopic measuring device is an x-ray spectrophotometer.

10. The apparatus according to claim 5 or 6, wherein the spectroscopic measuring device is a visible light spectrophotometer.

11. The apparatus according to claim 5 or 6, wherein the spectroscopic measuring device is a raman spectrophotometer.

12. The apparatus according to claim 5 or 6, wherein the spectroscopic measuring device is a microwave spectrophotometer.

13. The apparatus according to claim 5 or 6, wherein the spectroscopic measuring device is a nuclear magnetic resonance spectrophotometer.

14. The apparatus according to claim 1, wherein the measuring device is a polarimeter.

15. The apparatus according to claim 1, wherein the mixing vessel is stationary.

16. The apparatus according to claim 1, wherein the mixing vessel is part of a batch mixer.

17. The apparatus according to claim 1, wherein the mixing vessel is a part of a convective mixer.

18. The apparatus according to claim 17, wherein the mixer is a Nauta mixer.

19. The apparatus according to claim 1, wherein the directing unit and the detecting unit cooperate with at least one stationary wall portion of the vessel.

20. The apparatus according to claim 1, wherein the vessel is substantially in the shape of an inverted cone having a vertical center line, and wherein the stirring means comprises a mixing screw having a longitudinal axis, a first drive means arranged to rotate the screw around the longitudinal axis, and a second drive means arranged to cause the screw to process around the vertical center line.

21. The apparatus according to claim 20, wherein a first end of the screw is arranged on the vertical center line.

22. The apparatus according to claim 21, wherein the first end of the screw is at the bottom of the vessel.

23. The apparatus according to claim 19 or 20, further comprising at least one outlet port at the bottom of the vessel.

24. The apparatus according to claim 23, further comprising a supply line connected to the outlet port, and a flow control mechanism for causing the mixture to flow through the supply line.

25. The apparatus according to claim 24, wherein the flow control mechanism is a feed mechanism for feeding the mixture through the supply line.

26. The apparatus according to claim 24, wherein the supply line is configured such that the mixed material flows through the supply line by gravitational force, and the flow control mechanism is a valve for selectively permitting the mixed material to flow through the supply line.

27. The apparatus according to claim 26, wherein the supply line is substantially vertical.

28. The apparatus according to claim 1, further comprising at least one inlet port in a top portion of the vessel.

29. The apparatus according to claim 1, wherein the feeding mechanism is arranged to selectively feed the materials into the vessel through at least one inlet port of the vessel.

30. The apparatus according to claim 28 or 29, further comprising a plurality of supply vessels for containing separately the materials to be mixed in the mixing vessel, the supply vessels connected to the inlet port of the mixing vessel by respective feed lines, each feed line having a flow control mechanism operable to meter to the mixing vessel amounts of the respective materials to be mixed.

31. The apparatus according to claim 1, wherein the materials are powders.

32. The apparatus according to claim 1, wherein the materials are components of a pharmaceutical composition.

33. A method of preparing a mixture having a required homogeneity from a plurality of materials, comprising the steps of:

(a) introducing the materials to be mixed into a non-rotating mixing vessel;

(b) mixing the materials in the mixing vessel by activating a stirring means in the vessel;

(c) providing at least one measuring device configured to monitor in-line the homogeneity of the mixture being prepared in the vessel at a plurality of locations in the vessel; and (d) monitoring in-line at one or more locations in the vessel the homogeneity of the mixture being prepared in the vessel by directing input radiation into the vessel and by detecting output radiation following interaction of the input radiation with the materials in the vessel.

34. Thc method according to claim 33, wherein the homogeneity of the mixture being prepared in the vessel is monitored by a plurality of measuring devices at a of locations within the vessel.

35. The method according to claim 33 or 34, wherein the mixing is effected by driving a mixing screw in the vessel to rotate about its longitudinal axis, and simultaneously driving the screw to process along a periphery wall portion of the vessel around a vertical center line of the vessel.

36. The method according to claim 33, wherein the materials to be mixed are introduced as a batch into the mixing vessel.

37. The method according to claim 33, wherein the materials are powders.

38. The method according to claim 33, wherein the materials are components of a pharmaceutical composition.

* * * * *

UNITED STATES PATENT AND TRADEMARK OFFICE

CERTIFICATE OF CORRECTION

PATENT NO. : 6,595,678 B2
DATED : July 22, 2003
INVENTOR(S) : Folestad et al.

It is certified that error appears in the above-identified patent and that said Letters Patent is hereby corrected as shown below:

Column 7,
Line 5, delete "process" and substitute therefor -- precess --.

Column 8,
Line 24, insert -- plurality -- after "at a".
Line 29, delete "process" and substitute therefor -- precess --.

Signed and Sealed this

Twenty-fifth Day of November, 2003

JAMES E. ROGAN
*Director of the United States Patent and Trademark Office*